United States Patent Office 3,660,488
Patented May 2, 1972

---

3,660,488
2-HALO-ALKYLENE- AND -CYCLOPENTYLENE-2-AMINO-PROPANE 1,3-DIOLS
Raymond L. Cobb, Bartlesville, Okla., assignor to Phillips Petroleum Company
No Drawing. Filed July 16, 1965, Ser. No. 472,733
Int. Cl. C07c 87/02, 91/16, 95/02
U.S. Cl. 260—584  9 Claims

ABSTRACT OF THE DISCLOSURE 2-amino-2-halohydrocarbyl-1,3-propanediols are prepared by reacting tris(hydroxyhydrocarbyl)methylamine with an aldehyde to form a bicyclo reaction product, halogenating said reaction product and hydrolyzing the product of the halogenation reaction to form the corresponding amino- and halo-substituted alkanediols. The substituted alkanediols of the invention are useful as starting compounds for the preparation of 2-amino-2-mercaptoalkyl-1,3-propanediols which are compounds having known antiradiation activity.

---

This invention relates to novel compounds. In one aspect this invention relates to derivatives of alkanediols having multifunctional chemical groups substituted thereon. In another aspect, this invention relates to novel 2-amino-2-halomethyl-1,3-propanediols and their salts. In yet another aspect this invention relates to a method for preparing these novel compounds.

The object of this invention is to provide a multifunctional chemical derivative of an alkanediol which is a useful intermediate in the preparation of anti-radiation drugs.

Another object of this invention is to provide an alkanediol having an amino and halomethyl functional group in the molecule.

A further object of this invention is to provide processes for synthesizing these types of compounds.

Other objects and advantages will be apparent from the following description of the invention, and the novel features will be particularly pointed out hereinafter in connection with the appended claims.

The novel compounds of the present invention are prepared by a process illustrated by the following equation:

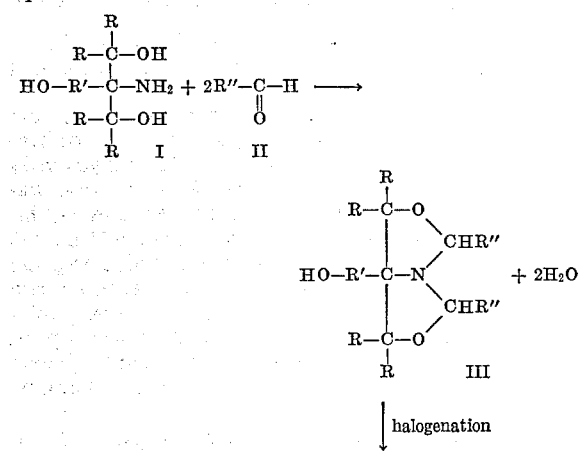

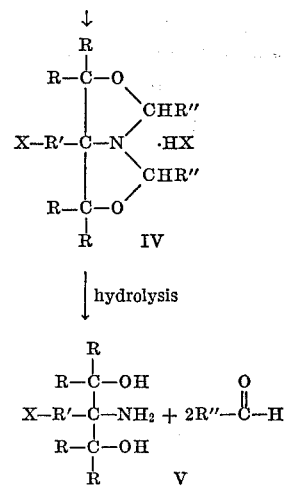

In the above formulae, R is selected from the group consisting of hydrogen and alkyl radicals containing from 1 to 3 carbon atoms, R' is selected from the group consisting of alkylene, arylene, and cycloalkylene radicals containing from 1 to 20 carbon atoms, R'' is selected from the group consisting of alkyl, aryl, alkaryl, and aralkyl radicals including those having up to 10 carbon atoms, X is selected from the group consisting of chlorine and bromine.

In carrying out the preparation of these novel compounds, at least 2 mols of the aldehyde (Formula II) are contacted with each mol of the tris(hydroxyhydrocarbyl)methylamine compound (Formula I) under conditions such that the reaction takes place with the formation of about 2 mols of water per mol of the aforementioned methylamine. This reaction is carried out at elevated temperatures in the presence of a suitable inert aliphatic or aromatic solvent such as benzene, toluene, pentane, heptane and the like. The water is removed as it is formed. A suitable apparatus for azeotropically removing the water from the reaction mixture is described in U.S. Pat. 2,994,644 Clay, issued Aug. 1, 1961. The reaction product consisting of the bicyclo compounds (Formula III) is halogenated by contact under reaction conditions with a halogenating agent selected from the group consisting of $SOCl_2$, $SOBr_2$, $PCl_3$, $PCl_5$, $PBr_3$, and a mixture of $Br_2$ or $Cl_2$ with $R'''_3P$, wherein R is a saturated acyclic, saturated cyclic, or aromatic radical having up to 20 carbon atoms, e.g., tributylphosphine, triphenylphosphine, etc., wherein the halogenated compound represented by Formula IV is produced. This compound is then hydrolyzed by contact with water under reaction conditions to provide the novel compounds of my invention (Formula V).

Some examples of the invention compounds produced by this process are:

2-amino-2-chloromethyl-1,3-propanediol
2-amino-2-bromomethyl-1,3-propanediol
2-amino-2-(8-chloro-n-decyl)-1,3-propanediol
2-amino-2-(2-bromoethyl)-1,3-propanediol
5-amino-5-(20-chloro-n-eicosyl)-4,6-nonanediol
2-amino-2-(p-chlorobenzyl)-1,3-propanediol
2-amino-2-(3-bromocyclopentyl)-1,3-propanediol
2-amino-2-(2-chlorophenyl)-1,3-propanediol 4-amino-4-bromomethyl-3,5-hexanediol
4-amino-4-(6-chloro-2,3-dimethylhexyl)-3,5-heptanediol
5-amino-5-(20-chloro-n-eicosyl)-4,6-di-n-propyl-4,6-nonanediol 2-amino - 2 - chloromethyl - 1,3 - propanediol, one of the compounds in the class of novel compounds produced by this method has utility as a chemical intermediate useful for the preparation of 2-amino-2-mercaptomethyl - 1,3 - propanediol which is useful as an anti-radiation drug. The reaction is represented as follows:

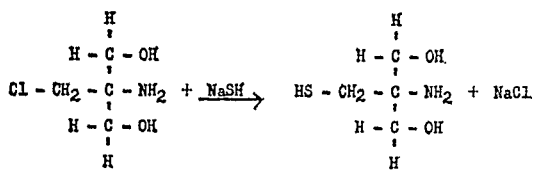

This drug can also be prepared by treating 2-amino-2-chloromethyl - 1,3 - propanediol with sodium benzyl mercaptide to form 2-amino - 2 - benzylthiomethyl-1,3-propanediol which is then debenzylated with sodium in liquid ammonia or a similar reagent. These reactions can be illustrated by the following equations:

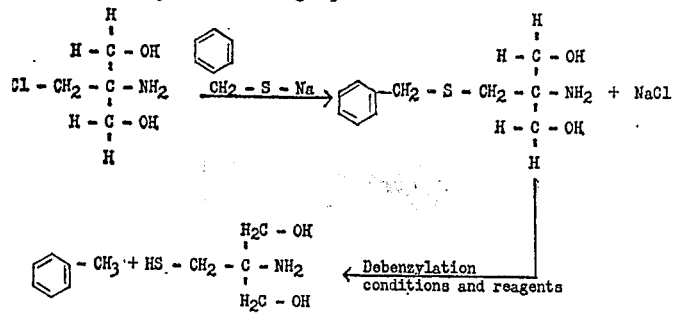

The 2-amino - 2 - halomethyl - 1,3 - propanediol compound can be converted to the corresponding bunte salt. The bunte salts are salts of the S-esters of thiosulfuric acid and are prepared by contacting the subject compound with sodium or thallium thiosulfate. The bunte compound is prepared either in the metallic salt form or in the free acid form as exemplified by the following compound: S-[2-amino - 2,2 - bis(hydroxymethyl)ethyl] thiosulfuric acid.

It is to be understood that the invention is not to be limited specifically to the 2-amino - 2 - halomethyl-1,3-propanediol but is to include the entire class of compounds shown in generic Formula V as well as their simple derivatives such as those shown above and their acid salts. These novel compounds all are valuable as alkylating agents or intermediates for the production insecticides, repellents, and other agricultural chemicals.

It is to be understood that these compounds can be prepared in a continuous medium in the solvents disclosed hereinabove and can be recovered by conventional methods, such as crystallization, distillation, solvent extraction, and the like. These recovery operations are conventional steps and are familiar to those skilled in the art. The technique for the recovery of specific compounds can vary somewhat due to differences in molecular weight, solubility, boiling point and the like.

The invention can be further illustrated by the following examples.

EXAMPLE I

Preparation of 1-aza-5-hydroxymethyl-2,8-diphenyl-3,7-dioxabicyclo(3,3,0)octane

A 242 gram quantity (2 mols) of tris(hydroxymethyl) methylamine and 424 grams (4 mols) of benzaldehyde were charged into a stirred reactor together with 1 liter of xylene. The mixture was stirred and refluxed for about 7.5 hours during which time the theoretical amount of water (about 4 mols) was collected in a Dean Stark trap. Most of the xylene was removed leaving a residual oil. This oil was dissolved in ether and the solution cooled until crystals formed. A total of 377 grams of white crystals which melted at about 93–95° C. was obtained. This melting point agreed with the literature melting point for 1-aza - 5 - hydroxymethyl - 2,8 - diphenyl-3,7-dioxabicyclo(3,3,0)octane.

Preparation of 2-amino-2-chloromethyl-1,3-propanediol hydrochloride

A 99 gram (0.33 mol) quantity of the bicyclo compound prepared above was charged into a stirred vessel together with 350 ml. of benzene. A 44 gram (0.37 mol) quantity of thionyl chloride ($SOCl_2$) was added to this mixture dropwise at room temperature and the mixture was stirred for an additional hour at room temperature. The contents of the vessel were then heated slowly to reflux and maintained at reflux for 1 hour during which time a white crystalline solid was formed. A 60 ml. quantity of 12 N hydrochloric acid in 150 ml. of water was then added to the mixture which was then stirred vigorously with heating. The formation of benzaldehyde was observed. The benzene was allowed to evaporate and the reaction mixture was stirred vigorously on the steam bath 3 hours after which it was extracted with diethyl ether to remove any remaining benzaldehyde. The remaining aqueous solution was evaporated to dryness. The residue was crystallized from isopropanol, containing enough water for solution when hot, yielding a total of 44 grams of white crystals (76 percent of theoretical). The portion of the recrystallized product melting at 92–94° C. was subjected to elemental analysis with the following results:

| Element | Calculated for $C_4H_{11}Cl_2NO_2$ | Found |
|---|---|---|
| C | 27.29 | 26.7 |
| H | 6.30 | 6.7 |
| N | 7.96 | 7.3 |

Thus, the analysis of the product agrees with the formula for 2-amino-2-chloro-methyl - 1,3 - propanediol hydrochloride.

A run was carried out to make the 2-amino-2-chloromethyl-1,3-propanediol hydrochloride without separation or isolation of intermediate products.

Water was azeotropically distilled from a vigorously stirred, refluxing mixture of 636 grams (6 mols) of benzaldehyde, 363 grams (3 mols) of tris(hydroxymethyl) methylamine, and 1 liter of xylene. Water removal was rapid, and 125 ml. (5.9 mols) was recovered in 2–3 hr. After cooling the resulting solution to about 90° C., 395 grams (3.3 mols) of thionyl chloride was added dropwise over a 2 hour period with vigorous stirring at steam bath temperature. An oil formed, followed by vigorous evolution of a gas, and then the (slightly exothermic) copious precipitation of a heavy cream colored solid. Heating with stirring was continued for an hour after crystallization occurred.

The 1 - aza - 5 - chloromethyl-2,8-diphenyl-3,7-dioxabicyclo(3,3,0)octane hydrochloride corresponding to Formula IV of this disclosure—which is present at this point, was not isolated. However in another test, some of this material was recovered from a solution in acetonitrile-diethyl ether yielding 2 crops of crystals melting at 187–189 and 190–193° C. respectively. The elemental analysis was as follows:

| Element | Calculated for $C_{18}H_{18}ClNO_2 \cdot HCl$ | Found |
| --- | --- | --- |
| C | 61.37 | 59.0 |
| H | 5.44 | 5.6 |
| N | 3.98 | 3.8 |

In addition, a quantity of the partially hydrolyzed product, 4 - chloromethyl - 4 - hydroxymethyl - 2 - phenyloxazolidine hydrochloride was isolated from hot acetonitrile as a white crystalline product having a melting point of 182–184° C. The elemental analysis was as follows:

| Element | Calculated for $C_{11}H_{14}ClNO_2 \cdot HCl$ | Found |
| --- | --- | --- |
| C | 50.02 | 49.6 |
| H | 5.72 | 5.6 |
| N | 5.30 | 5.0 |

After cooling the slurry of crystals to room temperature, 175 ml of concentrated hydrochloric acid and 500 ml. water were added. The mixture was stirred vigorously at 90–95° C. for 4 hours, causing rapid decomposition of the solid. The phases were separated while hot, and the organic layer was washed once with 150 ml. of concentrated hydrochloric acid. The latter was combined with the aqueous layer which was then washed with benzene, the benzene washings being discarded. The washed aqueous solution was saturated with hydrogen chloride at 20° C. Cooling in an ice bath gave 354 grams of the 2-amino-2-chloromethyl-1,3-propanediol hydrochloride as a white crystalline solid after washing well with isopropyl alcohol, tetrahydrofuran, and ether. Its melting point was 94–96° C. Concentration of the mother liquor to about 200 ml. and dilution of the solution with 500 ml. each of isopropyl alcohol and tetrahydrofuran gave another 64 grams of product for a total yield of 79 percent of theoretical.

The elemental analysis for this product was as follows:

| Element | Calculated for $C_4H_{10}ClNO_2 \cdot HCl$ | Found |
| --- | --- | --- |
| C | 27.29 | 27.3 |
| H | 6.30 | 6.5 |
| Cl | 40.28 | 39.7 |
| Cl (ionic) | 20.14 | 19.97 |
| N | 7.96 | 7.5 |
| O | 18.17 | 18.8 |

In addition, both infrared and NMR analyses of the product were consistent with the postulated structure of the product.

EXAMPLE II

Preparation of 2-amino-2-benzylthiomethyl-1,3-propanediol

To a solution of 550 grams (13.7 mols) of sodium hydroxide and 750 grams (6 mols) of benzyl mercaptan in 500 ml. each of methanol and oxygen-free water was added under nitrogen with stirring a suspension of 1170 grams (6.6 mols) of 2-amino-2-chloromethyl-1,3-propanediol hydrochloride, such as that prepared in Example I, in 1500 ml. water. The resulting mixture was heated under reflux in a nitrogen atmosphere for 18 hours. The mixture was then acidified with gaseous hydrogen chloride. After removing inorganic salts by filtration, the solution was extracted twice with toluene to remove unreacted benzyl mercaptan.

The aqueous residue was concentrated to about 1500 ml., extracted twice more with ether, and made basic with a liter of 40 percent sodium hydroxide. The product oil, in the form of the free base, was removed, and the aqueous solution was extracted twice with 1 liter portions of chloroform (the product oil was insoluble in hydrocarbons and diethyl ether). The extracts were combined with the product oil and the resulting solution was washed twice with water. After drying over magnesium sulfate, the oil was filtered. The solvents were stripped from the oil and it was then heated at 80° C. and 0.5 mm. pressure for 20 hours to give 906 grams (66 percent of theory) of the desired product. The elemental analysis for this product was as follows:

| Element | Calculated for $C_{11}H_{17}NO_2S$ | Found |
| --- | --- | --- |
| C | 58.12 | 57.7 |
| H | 7.54 | 8.1 |
| N | 6.16 | 5.8 |
| S | 14.11 | 14.5 |

The free base product slowly crystallized on long standing giving hard white crystals, recrystallized from diethyl ether containing a little tetrahydrofuran, which melted at 61–63° C. Elemental analysis found was as follows:

| Element | Found |
| --- | --- |
| C | 58.2 |
| H | 7.6 |
| N | 6.0 |
| S | 14.2 |

The product prepared from the same reactants, in another run, was isolated as the hydrochloride of 2-amino-2-benzylthiomethyl-1,3-propanediol. After acidification of the initial reaction mixture, the unreacted benzyl mercaptan was removed by benzene extraction and the aqueous solution of the product in the hydrochloride form was adjusted to about 4 N in hydrochloric acid. Crystallization from this liquid and recrystallization from tetrahydrofuran gave a 73 percent yield of crystals with a melting point of 108–110° C.

EXAMPLE III

Preparation of 2-amino-2-bromomethyl-1,3-propanediol hydrobromide

In a manner similar to that of Example I, 121 grams (1 mol) of tris(hydroxymethyl)methylamine, 212 grams (2 mols) of benzaldehyde, and 600 ml. xylene were refluxed with the removal of water to produce a xylene solution of the bicyclo compound. The xylene solution was cooled and was mixed with 202 grams (1 mol) of tributylphosphine. To this solution was added 160 grams (1 mol) of elemental bromine at 30–40° C. After addition of the bromine was complete, the mixture was heated at 90° C. for 1½ hours then 200 ml. concentrated hydrobromic acid and 300 ml. of water were added. The mixture was stirred under reflux for 3 hours, cooled to room temperature, and the aqueous phase was removed and evaporated under reduced pressure. A total of 129 grams of crystalline product was recovered from this residue by crystallization for various solvents. A 47 gram portion of 2-amino-2-bromomethyl-1,3-propanediol in the crystalline hydrobromide monohydrate form which melted at about 89–90° C. and had an elemental analysis as follows:

| Element | Calculated for $C_4H_{10}BrNO_2 \cdot HBr \cdot H_2O$ | Found |
| --- | --- | --- |
| C | 16.98 | 17.2 |
| H | 4.63 | 4.7 |
| N | 4.95 | 4.8 |

Thus, the analysis agreed with the formula for 2-amino-2-bromomethyl - 1,3 - propanediol hydrobromide monohydrate.

EXAMPLE IV

Reaction of 2-amino-2-bromomethyl-1,3-propanediol and Thallium Thiosulfate (bunte salt reaction)

A 28.4 gram (0.1 mol) quantity of the compound prepared above was contacted with 52.1 grams (0.1 mol) of thallium thiosulfate in the presence of 200 ml. water at 50° C. for 1 week. The mixture was then cooled, the thallium salts were filtered out, and the water was evaporated on a steam bath leaving the product in the form of a viscous oil. A 19.5 gram quantity (90 percent of theoretical) of the bunte salt (acid form), S-[2-amino-2,2-bis-(hydroxymethyl)ethyl]-thiosulfuric acid was obtained by crystallization from methanol and tetrahydrofuran. The elemental analysis for the product was a follows:

| Element | Calculated for $C_{14}H_{11}NO_5S_2$ | Found |
|---|---|---|
| C | 22.10 | 22.3 |
| H | 5.10 | 5.8 |
| N | 6.45 | 6.3 |
| S | 29.52 | 29.7 |

Obviously many modifications and variations of the present invention are possible in the light of the above teachings. It is therefore to be understood that within the scope of the appended claims the invention may be practiced otherwise than as specifically described herein.

What is claimed is:

1. A composition of matter having the general formula

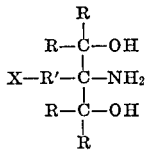

wherein R is selected from the group consisting of hydrogen and alkyl radicals containing 1-3 carbon atoms; R' is selected from the group consisting of cyclopentylene and radicals containing from 1-20 carbon atoms; and X is selected from the group consisting of chlorine and bromine.

2. A composition of matter according to claim 1 wherein R' is an alkylene, having 1-20 carbon atoms.

3. 2-amino-2-chloromethyl-1,3-propanediol.

4. 2-amino-2-bromomethyl-1,3-propanediol.

5. A method of preparing compounds having the general formula

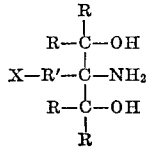

wherein R is selected from the group consisting of hydrogen and alkyl radicals containing 1-3 carbon atoms; R' is selected from the group consisting of cyclopentylene and alkylene radicals containing from 1-20 carbon atoms; and X is selected from the group consisting of chlorine and bromine; which comprises the steps of reacting tris-(hydroxyhydrocarbyl)methylamine having the general formula

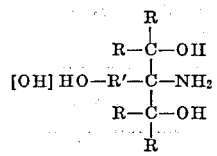

with an aldehyde having the general formula

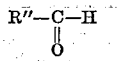

wherein R'' is selected from the group consisting of alkyl and aralkyl radicals having 1-10 carbon atoms at a sufficient temperature to form a bicyclo reaction product; halogenating said product with a compound selected from the group consisting of $SOCl_2$, $SOBr_2$, $PCl_3$, $PCl_5$, $PBr_3$, and a mixture of $Br_2$ or $Cl_2$, with $R'''_3P$, wherein $R'''$ is selected from the group consisting of saturated acyclic, saturated cyclic or aromatic radicals having from 1-20 carbon atoms; hydrolyzing the halogenated product; and recovering said compounds.

6. A method according to claim 5 wherein the reaction is carried out in the presence of a hydrocarbon diluent.

7. A method according to claim 5 wherein R' is alkylene, having 1-20 carbon atoms.

8. A method for preparing 2-amino-2-chloromethyl-1,3-propanediol, said method comprising the steps of reacting 1 mol of tris(hydroxymethyl)methylamine with 2 mols of benzaldehyde in the presence of xylene at a sufficient temperature to form 1-aza-5-hydroxymethyl-2,8-diphenyl-3,7-dioxabicyclo(3,3,0) - octane; continuously removing any water from the reaction mixture; halogenating the said octane with $SOCl_2$; hydrolyzing the halogenated octane to form 2-amino-2-chloromethyl-1,3-propanediol.

9. A method according to claim 8 including the step of extracting the 2 - amino - 2 - chloromethyl-1,3-propanediol from the reaction mixture.

References Cited

UNITED STATES PATENTS

| | | | |
|---|---|---|---|
| 2,545,498 | 3/1951 | Sowdern et al. | 260—570.6 X |
| 2,777,854 | 1/1957 | Edgerton et al. | 260—570.6 X |
| 3,062,839 | 11/1962 | Shetty et al. | 260—347.7 |

OTHER REFERENCES

Preussmann, "Arzneimittel-Forsch," vol. 8, pp. 638-43 (1958).

Ruoff et al., 'J.A.C.S.," vol. 72, pp. 1417-19 (1950).

ROBERT V. HINES, Primary Examiner

U.S. Cl. X.R.

260—307, 307.6, 453, 563, 570.5, 570.6, 999

UNITED STATES PATENT OFFICE

CERTIFICATE OF CORRECTION

Patent No. 3,660,488                              Dated: May 2, 1972

Raymond L. Cobb

It is certified that error appears in the above-identified patent and that said Letters Patent are hereby corrected as shown below:

Column 7, line 39, before "radicals" insert --- alkylene ---; Column 8, in the formula between lines 5 and 10, delete "[OH]".

Signed and sealed this 17th day of October 1972.

(SEAL)
Attest:

EDWARD M. FLETCHER, JR.                              ROBERT GOTTSCHALK
Attesting Officer                                             Commissioner of Patents